United States Patent
Cho et al.

(10) Patent No.: US 8,958,461 B2
(45) Date of Patent: Feb. 17, 2015

(54) SYSTEM AND METHOD FOR IMPROVING CHANNEL EFFICIENCY IN A WIRELESS LINKL

(75) Inventors: James S. Cho, Mountain View, CA (US); Shiwei Zhao, Union City, CA (US)

(73) Assignee: Qualcomm Incorporated, San Diego, CA (US)

( * ) Notice: Subject to any disclaimer, the term of this patent is extended or adjusted under 35 U.S.C. 154(b) by 524 days.

(21) Appl. No.: 13/219,797

(22) Filed: Aug. 29, 2011

(65) Prior Publication Data
US 2013/0051441 A1    Feb. 28, 2013

(51) Int. Cl.
H04B 1/38    (2006.01)
H04L 1/16    (2006.01)
H04W 28/22   (2009.01)
H04W 84/12   (2009.01)

(52) U.S. Cl.
CPC ............. H04L 1/1671 (2013.01); H04W 28/22 (2013.01); *H04W 84/12* (2013.01)
USPC ............................ 375/219; 375/295; 375/316

(58) Field of Classification Search
USPC .......................................... 375/219, 295, 316
See application file for complete search history.

(56) References Cited

U.S. PATENT DOCUMENTS

2010/0265861 A1   10/2010   He et al.
2011/0130099 A1*  6/2011    Madan et al. ................. 455/63.1

OTHER PUBLICATIONS

International Search Report and Written Opinion—PCT/US2011/055420—ISA/EPO—Jan. 20, 2012.

* cited by examiner

*Primary Examiner* — Leila Malek
(74) *Attorney, Agent, or Firm* — Bay Area Technology Law Group PC

(57) ABSTRACT

System and method for improving channel efficiency in a wireless link between an access-point transceiver and a first transceiver. The first transceiver may have a first data throughput rate that is lower than the maximum possible data throughput rate of the wireless link. The first transceiver may include a first receive buffer. An indication of the first data throughput rate and a size of the first receive buffer may be received and stored by the access-point transceiver. A first size of a first data packet for transmission to the first transceiver may be determined by the access-point transceiver based on one or more of the first data throughput rate and/or the size of the first receive buffer. The first data packet of the first size may be transmitted to the first transceiver by the access-point transceiver at a data rate that is higher than the first data throughput rate.

18 Claims, 6 Drawing Sheets

SYSTEM AND METHOD FOR IMPROVING CHANNEL EFFICIENCY IN A WIRELESS LINKL

BACKGROUND

1. Field of the Disclosure

The present invention relates generally to wireless communication, and more particularly to a system and method for improving channel efficiency in a wireless link between wireless devices.

2. Description of the Related Art

Wireless communication is being used for a plethora of applications, such as in laptops, cell phones, and other wireless communication devices ("wireless devices"). It has been common in the past for the maximum throughput rate of a wireless link to be the most limiting factor in the speed of wireless communication. However, with the improvement in wireless communication data rates and the increasingly widespread implementation of wireless communication capabilities (e.g., including in devices with relatively limited processing and/or interface capabililities), it is possible for a wireless device to be able to natively support a lower maximum possible data throughput rate than the maximum possible data throughput rate of the wireless link. This can potentially lead to problems.

As one example, a mobile device in an 802.11 (WLAN) network might in some situations (e.g., depending on the processing capability and/or wireless adapter interface of the mobile device and the quality of the WLAN link) not be able to process packets at as high of a rate as it is possible for them to be transmitted over the WLAN link. In the absence of any mitigating factors, this can lead to packet loss, extensive retry attempts, and rate drops, which in turn can cause power waste and may degrade network capacity.

FIG. 1 illustrates two examples of how this could happen at two different receivers, e.g., depending on the implementation. As shown, packets may be buffered initially, but eventually once the buffer is full, packets may be dropped.

One simple solution is to limit the PHY rate of the wireless link to the highest supported data rate of the limiting device. This would avoid unnecessary packet losses, but a given packet would take longer to transmit and receive than if the maximum PHY rate of the wireless link were used, resulting in higher power consumption and lower network throughput. Accordingly, improvements in the field would be desirable.

SUMMARY OF THE DISCLOSURE

Embodiments of the disclosure are presented in order to improve channel efficiency in a wireless link between two wireless devices. More specifically, embodiments of the disclosure are directed at situations in which a data throughput rate of at least one of the two wireless devices wirelessly linked is lower than a maximum possible data throughput rate of the wireless link itself.

Embodiments of the disclosure accordingly include methods for improving channel efficiency in a wireless link between an access-point transceiver (e.g., configured for use in an access-point wireless device) and a first transceiver (e.g., configured for use in a first wireless device), and systems configured to implement the methods. In some embodiments, the wireless link may be an IEEE 802.11 wireless link, and the access-point transceiver and the first transceiver may be comprised in IEEE 802.11 enabled wireless devices. Alternate types of wireless links are also considered.

The access-point transceiver may include an antenna for receiving and transmitting wireless signals and a memory for storing parameter information for the wireless link. The access-point transceiver may also include control logic (which may include a processor and a memory medium comprising program instructions executable by the processor) coupled to the antenna and the memory.

The first transceiver may include an antenna for receiving and transmitting wireless signals. The first transceiver may also include a receive buffer. The first receive buffer may store information received by the first transceiver over the wireless link (e.g., via the antenna) for processing by the first transceiver. The first transceiver may further include control logic (which may include a processor and a memory medium comprising program instructions executable by the processor) coupled to the antenna and/or the receive buffer, e.g., for processing data received via the wireless link. The first transceiver may have a first data throughput rate that is lower than the maximum data throughput rate of the wireless link. In some embodiments, the first data throughput rate may be lower than the maximum possible data throughput rate of the wireless link because of the data throughput capability of one or more of a wireless link interface of the first transceiver and/or a processing capability of the first transceiver.

In a first set of embodiments, a system implementing a first method for improving channel efficiency in the wireless link may include the access-point transceiver, or an access-point wireless device in which the access-point transceiver is implemented. In some embodiments, the control logic of the access-point transceiver may be configured to implement the method.

An indication of the first data throughput rate and a size of the first receive buffer may be received and stored. The indication of the first data throughput rate and the size of the first receive buffer may be determined by and received from the first transceiver via the antenna of the access-point transceiver.

A first size of a first data packet for transmission to the first transceiver may be determined. Determining the first size of the first data packet may be based on one or more of the first data throughput rate and/or the size of the first receive buffer. In one embodiment, the first size of the first data packet may be based on the size of the first receive buffer, and may be smaller than the size of the first receive buffer.

The first data packet of the first size may be transmitted to the first receiver. The first data packet may be transmitted via the antenna of the access-point transceiver. The first data packet of the first size may be transmitted to the first receiver at a data rate (e.g., a signaling or PHY rate) that is higher than the first data throughput rate.

In some embodiments, a first transmission frequency at which packets of the first size should be transmitted to the first transceiver may be determined. The first transmission frequency may be determined based on the first data throughput rate. A plurality of data packets of the first size may thus be transmitted to the first transceiver at the first transmission frequency. Transmitting the plurality of data packets of the first size may be performed at a data rate (e.g., a signaling or PHY rate) that is higher than the first data throughput rate. In some embodiments, transmitting the plurality of data packets of the first size at the first transmission frequency at the data rate that is higher than the first data throughput rate may provide data to the first transceiver at an effective data throughput rate that is at or below the first data throughput rate. In other words, transmitting the plurality of data packets of the first size at the first transmission frequency at the data rate that is higher than the first data throughput rate may not cause an overflow of the first receive buffer even though the transmitting is occurring at a higher data rate than the first data throughput rate.

Alternatively, in some embodiments, an available amount of memory in the first receive buffer may be estimated. Estimating the available amount of memory in the first receive buffer may be based on the first data throughput rate, the size of the first receive buffer, the first size of the first data packet, and an elapsed time since transmission of the first data packet. A second size of a second data packet for transmission to the first transceiver may be determined. The second size of the second data packet may be determined based on the estimated available amount of memory in the first receive buffer. The second data packet of the second size may be transmitted to the first transceiver at a data rate (e.g., a signaling or PHY rate) that is higher than the first data throughput rate.

In some embodiments, the wireless link may be extended to a second transceiver. It may be determined, based on the extension of the wireless link to the second transceiver, that the (effective) data throughput to the first transceiver over the wireless link is unlikely to exceed the first data throughput rate (although the actual signaling rate of transmissions may still be higher than the first data throughput rate). In this case, the access-point transceiver may not determine sizes of data packets for transmission to the first transceiver based on the first data throughput rate or the size of the first receive buffer, e.g., in response to determining that data throughput to the first transceiver over the wireless link is unlikely to exceed the first data throughput rate.

Alternatively, in some embodiments, the access-point transceiver may perform traffic flow control for the second device as well. For example, the second transceiver (which may include a second receive buffer) may have a second data throughput rate that is lower than the maximum possible data throughput rate of the wireless link. An indication of the second data throughput rate and a size of the second receive buffer may be received and stored. A second size of a second data packet for transmission to the second transceiver may be determined. Determining the second size of the second data packet may be based on one or more of the second data throughput rate and/or the size of the second receive buffer. The second data packet of the second size may be transmitted to the second transceiver at a data rate that is higher than the second data throughput rate.

In a second set of embodiments, a system implementing a second method for improving channel efficiency in the wireless link may include the first transceiver, or a first wireless device in which the first transceiver is implemented. In some embodiments, the control logic (e.g., a processor and a memory medium including program instructions executable by the processor) of the first transceiver may be configured to implement the method.

A first data frame may be received via the wireless link. The first data frame may be stored in the receive buffer. An amount of available memory in the receive buffer may be monitored and it may be determined that the amount of available memory in the receive buffer is below a first threshold.

A frame acknowledgement may be generated. The frame acknowledgement may acknowledge receipt of the first data frame by the first transceiver. The frame acknowledgement may also include an indication of initiation of a power savings mode by the first transceiver. The indication of initiation of a power savings mode by the first transceiver may be included in the frame acknowledgement based on the determination that the amount of available memory in the receive buffer is below the first threshold. In some embodiments, the first transceiver may not actually enter a power savings mode, even though the first transceiver may include the indication of initiation of a power savings mode by the first transceiver in the frame acknowledgement.

The frame acknowledgement may be transmitted to the access-point transceiver. The access-point transceiver may not transmit a next data frame to the first transceiver after receiving the frame acknowledgement based on the indication of initiation of the power savings mode.

The first data frame stored in the receive buffer may be processed (e.g., instead of entering a power savings mode). Based on processing the first data frame in the receive buffer, the amount of available memory in the receive buffer may increase above the second threshold. It may be determined (e.g., based on monitoring the amount of available memory in the receive buffer) that the amount of available memory in the receive buffer is above a second threshold.

An indication of termination of the power savings mode by the first transceiver may be generated. The indication of termination of the power savings mode by the first transceiver may be transmitted to the access-point transceiver. Generating and transmitting the indication of termination of the power savings mode by the first transceiver may be based on the determination that the amount of available memory in the receive buffer is above the second threshold. After receiving the indication of termination of the power savings mode by the first transceiver (e.g., and based on receiving the indication of termination of the power savings mode by the first transceiver), the access-point transceiver may transmit the next data frame to the first transceiver.

BRIEF DESCRIPTION OF THE DRAWINGS

A better understanding of the present invention can be obtained when the following Detailed Description of the Embodiments is read in conjunction with the following drawings, in which.

Figure 1:
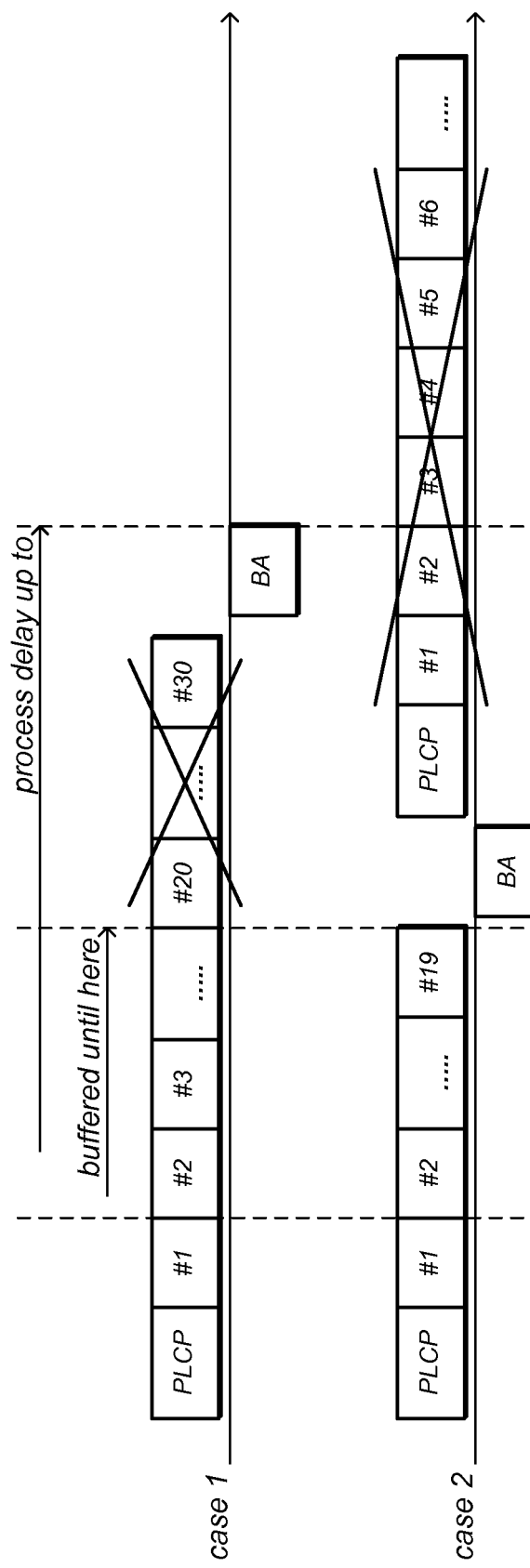
FIG. 1 is a diagram illustrating potential packet loss due to limitations of a receiving device in a prior art system.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS OF THE DISCLOSURE

Terms

The following is a glossary of terms used in the present application:

Memory Medium—Any of various types of memory devices or storage devices. The terms "memory" and "memory medium" are intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as flash memory, hardware registers, a magnetic media (e.g., a hard drive), or optical storage. The memory medium may comprise other types of memory as well, or combinations thereof. The term "memory medium" may include two or more memory mediums.

Computer System—Any of various types of mobile or stationary computing or processing systems, including a personal computer system (PC), mainframe computer system, workstation, network appliance, Internet appliance, mobile phone, smart phone, laptop, notebook, netbook, or tablet computer system, personal digital assistant (PDA), multimedia device, or other device or combinations of devices. In general, the term "computer system" can be broadly defined to encompass any device (or combination of devices) having at least one processor that executes instructions from a memory medium.

Wireless Link—A wireless communicative coupling between two devices (which may be referred to as "wireless devices"). A wireless link may be established via any of a variety of wireless communication protocols, including any of various versions of IEEE 802.11 (WLAN), Bluetooth, Wibree, wireless USB, ZigBee, or any of various cellular network protocols, among others.

Access-Point Device—As used herein, an access-point device is considered a device that allows another device to establish a communicative coupling (e.g., wireless and/or wired) with the access-point device. According to some communicative protocols, an access point device may be required to be specifically configured to be an access point device, while other communicative protocols may allow any device configured according to that protocol to act as an access-point device.

FIG. 2

Figure 2:
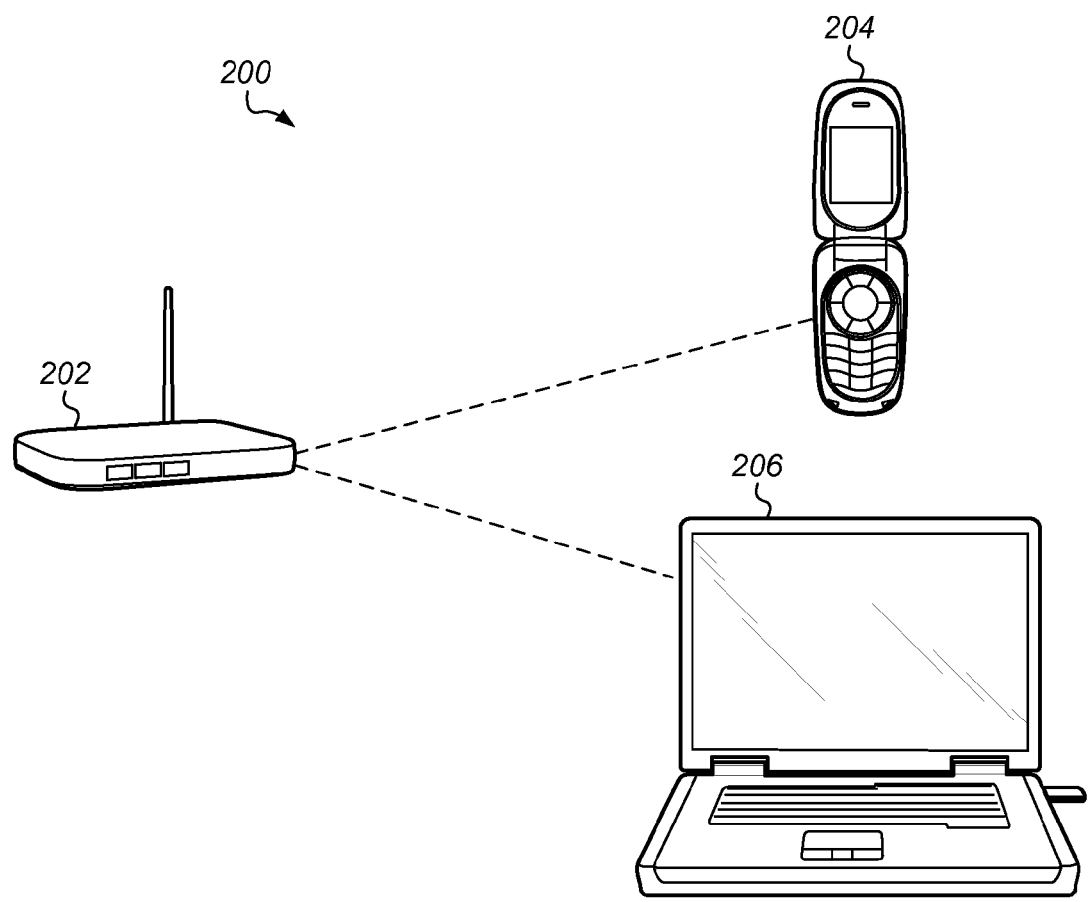
FIG. 2 illustrates exemplary wireless links between wireless devices, according to one embodiment.

Embodiments of the disclosure relate to improving channel efficiency in wireless links between wireless devices. FIG. 2 illustrates an exemplary system 200 including wireless links between wireless devices 202, 204, 206, which may be configured to implement embodiments of this disclosure. The wireless links may enable wireless communication between wireless devices 202, 204, 206 according to any of a variety of wireless communication technologies. In one exemplary implementation, the wireless links may be established as part of an IEEE 802.11 (WLAN) network. For example, wireless device 202 is shown as a router, and may act as a gateway-type device (i.e., an access point transceiver). Thus in such an embodiment, any WLAN enabled wireless devices within communicative range, such as mobile phone 204 or laptop computer 206 (or both), may establish a WLAN wireless link with router 202 to join the WLAN network.

In other envisioned embodiments, the wireless links may be established according to any of a variety of other wireless communication protocols. Examples of possible wireless technologies using which embodiments of the disclosure could be implemented include, without limitation, cellular networks, Bluetooth, ZigBee, Wireless USB, RFID, Dedicated Short Range Communications (DSRC), or any other suitable wireless technology.

Furthermore, while the illustrated embodiment shows links specifically between router 202 and mobile phone 204, and router 202 and laptop 206, it should be noted that, in various embodiments, wireless links may be between any of a wide variety of suitable wireless devices, which may include, without limitation, mobile phones (including smart phones); tablet, netbook, notebook, laptop, and/or desktop computers; personal digital assistants; multimedia players (portable or stationary); routers, hubs, and/or other gateway type devices; and/or other mobile devices/computing systems which are operable to use wireless communication. In particular, it should be noted that while in some embodiments wireless links may need to be established through a gateway-type device (such as router 202), other embodiments are envisioned in which any wireless device may wirelessly communicate directly with any other wireless device (e.g., in which a wireless link directly between mobile phone 204 and laptop computer 206 could be established).

In some embodiments, communication via a wireless link may be performed at a variety of possible data rates ("wireless link data throughput rates"). For example, in a WLAN wireless link, it may be possible for wireless signaling to be performed at a variety of different physical (PHY) layer data rates, up to a maximum supported data rate, which may depend on what version of the protocol each device in the link supports, how many antennas each device utilizes (e.g., for Multiple Input Multiple Output (MIMO)), channel conditions, channel bandwidth, etc.

Independently of the wireless link data throughput rate, each of the wireless devices communicatively coupled by the wireless link may be capable of utilizing data received via the wireless link at a certain rate (a "wireless device data throughput rate"). This wireless device data throughput rate may be limited by one or more factors. For example, some wireless devices (e.g., devices which perform relatively limited or basic functions) may have a relatively minimal native processing capability. As another example, in some embodiments, a wireless link interface (e.g., a wireless adapter interface) could be a limiting factor. A wireless device utilizing a wireless adapter which interfaces to the wireless device via USB, SDIO, or another interface, could be limited by the data throughput rate of that interface. Other limitations are also possible.

If the wireless device data throughput rate of a wireless device wirelessly linked to another wireless device is lower than the wireless link data throughput rate, it is possible that the wireless device will fall behind in processing the data received via the wireless link. This can potentially result in extensive data loss and attempts to retransmit the lost data, and/or a decreased wireless link data throughput rate. This, in turn, can degrade network capacity (e.g., in network-type wireless links), and cause significant power waste.

Accordingly, embodiments of the disclosure are directed to embodiments of a method for improving channel efficiency in a wireless link between wireless devices in which at least one of the wireless devices has a data throughput rate that is lower than the maximum possible data throughput rate of the wireless link. The method may provide receive flow control for the limited wireless device in order that the maximum possible data throughput rate of the wireless link may be used without the extensive data loss and retry that might otherwise occur.

FIGS. 3A-3B

Figure 3A:
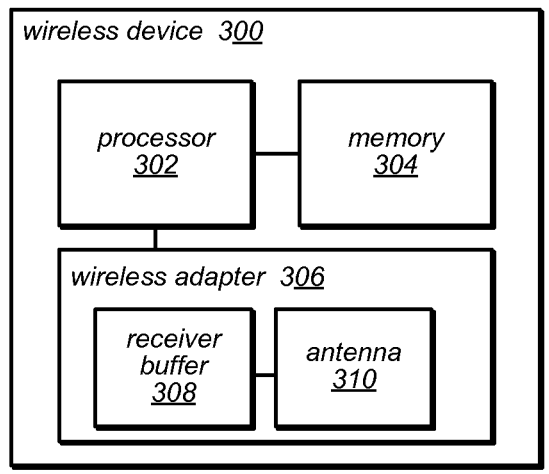
FIGS. 3A and 3B are block diagrams of exemplary wireless devices according to one embodiment.
Figure 3B:
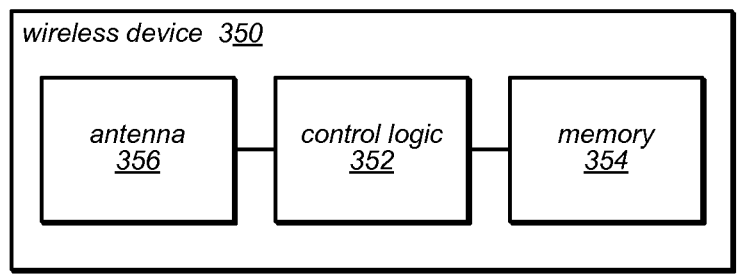

FIGS. 3A and 3B are simplified block diagrams illustrating various components of wireless devices which are capable of establishing a wireless link with another wireless device according to various embodiments of the disclosure.

FIG. 3A illustrates a wireless device 300 which includes a processor 302, and a memory 304. The memory 304 may store program instructions executable by the processor 302 to perform one or more aspects of the methods disclosed herein, and/or perform other device functionality. The wireless device 300 may be any of a variety of types of device, and may implement any of a variety of functionalities, according to various embodiments. For example, wireless device 300 may be a mobile phone (such as mobile phone 204 shown in FIG. 1) or smart phone, a laptop (such as laptop 206 shown in FIG. 2) or other computer, or generally any other type of device which may be used to communicate wirelessly.

The wireless device 300 may also include a wireless adapter 306. The wireless device 300 may utilize the wireless adapter 306 in order to form wireless links. According to some embodiments, the wireless adapter 306 may be housed internally to (i.e., within a casing of) wireless device 300, and may couple to an internal system bus or otherwise be communicatively coupled to processor 302. Alternatively, wireless adapter 306 may be coupled to wireless device 300 via an external interface (e.g., USB, SDIO, or any other external interface).

The wireless adapter 306 may implement one or more wireless protocols. In one example, wireless adapter 306 may be a WLAN adapter. In other embodiments, wireless adapter 306 may implement other wireless protocols. Wireless adapter 306 may include circuitry configured to implement the wireless protocol(s), including a receive buffer 308 (e.g., to buffer received signals until they can be processed by wireless device 300) and an antenna 310 (e.g., to transmit and/or receive signals wirelessly), among other possible components. Embodiments are also envisioned in which the wireless adapter 306 includes multiple antennas (e.g., for MIMO and/or for implementing multiple wireless protocols).

FIG. 3B illustrates a wireless device 350 including control logic 352, a memory 354, and an antenna 356. The wireless device 350 may be any of a variety of types of device, and may implement any of a variety of functionalities, according to various embodiments. For example, wireless device 350 may be a router (such as router 202 shown in FIG. 2), hub, gateway, or generally any type of device which may be used to communicate wirelessly.

According to some embodiments, the wireless device 350 may act as an access-point transceiver implementing one or more wireless protocols. As one example, the wireless device 350 may be a WLAN router. In other embodiments, wireless device 350 may be a different type of device. The control logic 352 may implement the wireless protocol(s), in combination with memory 354 (e.g., as a buffer and/or source of program instructions for a processor) and antenna 356 (e.g., to transmit and/or receive signals wirelessly). Similar to wireless adapter 306 in wireless device 300, the wireless device 350 may in some embodiments include multiple antennas (e.g., for MIMO and/or for implementing multiple wireless protocols).

As will be understood by those of skill in the art in light of this disclosure, wireless devices 300 and 350 may also include any of a variety of other components as desired, e.g., for implementing other device functionality. Such components are not shown in order to avoid obscuring details of the disclosure.

In addition, it will be apparent that those components shown may be implemented in any of a variety of ways, according to principles of the methods disclosed herein. For example, according to various embodiments, control logic 352 in wireless device 350 may be implemented using any of various types of logic, such as analog logic, digital logic, a processor and memory (such as a CPU, DSP, microcontroller, etc.), an ASIC (application specific integrated circuit), an FPGA (field programmable gate array), or any combination of the above. Embodiments are similarly envisioned in which wireless device 300 utilizes other types of control logic in addition to or instead of processor 302 and memory 304.

FIGS. 4A-4B

Figure 4A:
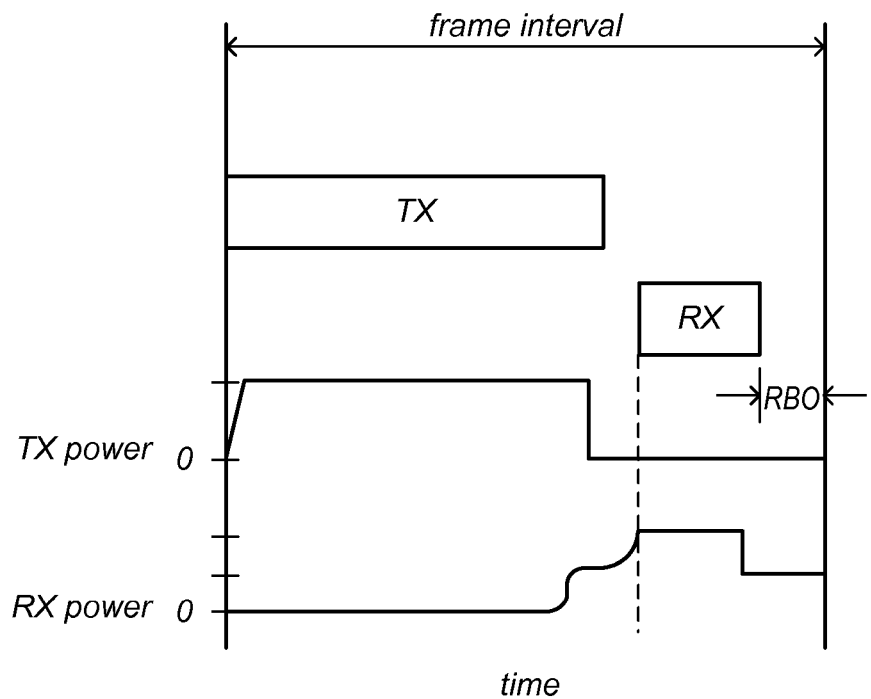
FIGS. 4A and 4B are graph diagrams illustrating transmit and receive timing and energy use at different wireless link PHY rates according to one embodiment.
Figure 4B:
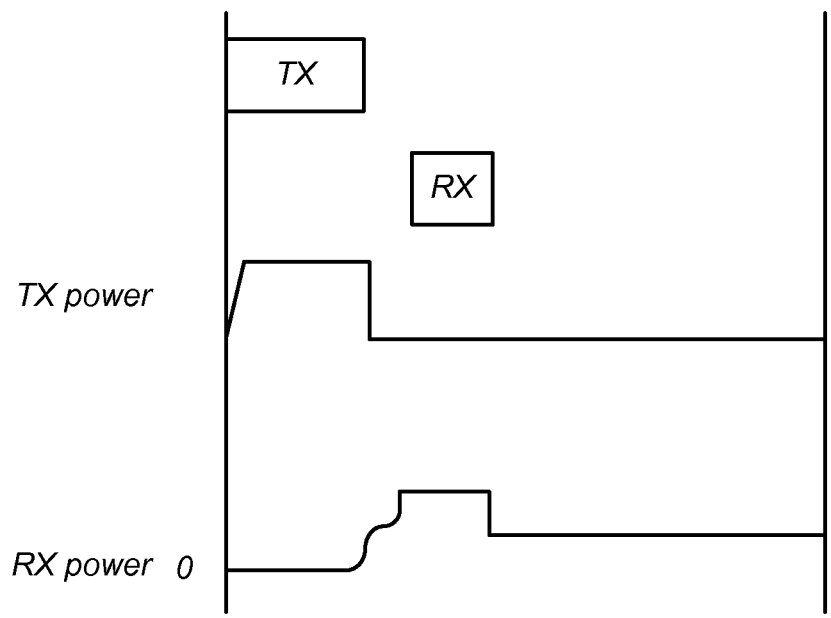

FIGS. 4A-4B illustrate transmit and receive timing and energy use of a wireless device (e.g., any of wireless devices 202, 204, or 206 shown in FIG. 2) at different wireless link data rates (i.e., PHY or signaling rates). The illustrated examples may take place in a WLAN implementation according to one embodiment. FIGS. 4A-4B are intended to illustrate an equal amount of time elapsing and an equal amount of data being transmitted.

FIG. 4A illustrates a lower wireless link data rate relative to FIG. 4B. In both cases, the wireless device may transmit a frame (during which time full transmit power is used). Following this, the wireless device may enter an active search state, during which it may expect to receive a frame acknowledgement. During the search state, the receiver may be partially powered. Once the receiver begins actively receiving the frame acknowledgement, the receiver may be fully powered. After the frame acknowledgement is received, the wireless device may wait for a period of time (e.g., a random back-off (RBO)), before contending again for permission to transmit data. During this time the receiver may be partially powered (e.g., RX search automatic gain control (AGC) may be on) in case of incoming transmissions.

As shown, at the lower data rate of FIG. 4A, the active transmit period of time may be longer than at the higher data rate of FIG. 4B. Accordingly, the energy used by the wireless device will be higher to transmit the same amount of data. Furthermore, a subtler point in WLAN implementations is that the transmit power at lower PHY rates may typically be higher than the transmit power at higher PHY rates. This may be because error vector magnitude (EVM) requirements at the highest PHY rates may be more strict than at lower PHY rates, correspondingly requiring a lower transmit power. Thus, at a lower data rate, it may not only take longer to transmit a given amount of data than at a higher data rate, but more power may also be used per unit of time.

While the illustrated embodiments of FIGS. 4A-4B are directed to a WLAN implementation, it should be noted that similar (and/or other) concerns may exist for other types of wireless links. Generally speaking, lower signaling rates may be expected to take longer to transmit an equal amount of data, typically resulting in a higher power usage. It is difficult to overstate the importance of power savings, especially in mobile devices in which battery life may be at a premium.

In addition to power usage related concerns, it is worth noting that the larger amount of time required to transmit a given amount of data at a lower signaling rate directly results in a degraded overall network capacity, e.g., in a network system (such as WLAN). In other words, if a wireless device spends longer in transmitting and receiving data over the network because it is forced to use a lower data rate, there may necessarily be that much less time available to other wireless devices in the network to communicate.

Accordingly, it is generally desirable to transmit at higher signaling rates when possible. However, as noted above with respect to FIG. 2, sometimes a receiving device has a data throughput rate that is lower than a maximum possible data throughput rate (e.g., signaling rate) of a wireless link. In the absence of any mitigating factors, transmitting at a wireless link data throughput rate that is higher than a wireless device data throughput rate may result in overflow of a receive buffer of the wireless device. Overflow of the receive buffer may in turn cause data transmitted over the wireless link to be lost. That lost data may be retransmitted, sometimes repeatedly. Thus, power waste and network capacity may still be degraded. Furthermore, as a result of repeated data loss at a higher wireless link data throughput rate, the communication protocol being used may require that a lower wireless link data throughput rate may be used, which, as noted above, also results in power waste and degraded network capacity.

One possible solution, e.g., again in an exemplary WLAN implementation, would be to include a mechanism for flow control in a new version of the protocol. For example, a field in block acknowledgement frames could be defined to allow a wireless device which is receiving a frame to notify a wireless device which is transmitting the frame of how much receive buffer remains available (e.g., in MAC protocol data units (MPDUs)). However, this mechanism may not be ideal. For example, this mechanism would require new hardware support at both receiving and transmitting wireless devices. In addition, it would not be backward compatible and older devices would not be able to take advantage of the mechanism. Furthermore, the mechanism would introduce additional complexity in both receiving and transmitting devices. For example, not only would the receiving device need to be able to monitor/track its available buffer size, the transmitting device would need to be able to immediately adjust its transmit queue based on notifications of remaining available buffer of the receiving device. Two alternative mechanisms for controlling traffic flow, which have several advantages over this method, are provided below as the methods of FIGS. 5-6.

FIGS. 5-6

FIGS. 5-6 are flowchart diagrams illustrating embodiments of methods for improving channel efficiency in a wireless link between a first transceiver (e.g., for use in a first wireless device) and an access-point transceiver (e.g., for use in an access-point wireless device). According to some embodiments, the wireless link may be an IEEE 802.11 (WLAN) wireless link, and the first and access-point transceivers may be IEEE 802.11 enabled transceivers. The first wireless device may be a mobile device in some embodiments; alternatively, the first wireless device may be stationary.

Embodiments of the methods may be implemented by either of the first or access-point wireless devices. For example, the method of FIGS. 5A-5B may typically be implemented by the access-point wireless device while the method of FIGS. 6A-6B may typically be implemented by the first wireless device. In some embodiments, the first and access-point wireless devices implementing the method(s) may be implemented according to any of the systems of FIGS. 2-3 of this disclosure.

The methods may enable the wireless devices to communicate via the wireless link using a maximum supported data throughput rate (e.g., a signaling or PHY rate) of the wireless link even if one of the wireless devices (e.g., the first wireless device) has a data throughput rate (e.g., a device-limited maximum data throughput rate) that is lower than the maximum data throughput rate of the wireless link, without overloading the limited wireless device and causing packet loss and extensive retry attempts. The methods may thereby result in improved channel efficiency in the wireless link relative to using a lower data throughput rate of the wireless link or using the maximum supported data throughput rate of the wireless link without the method.

The methods of FIGS. 5-6 may be used in combination (e.g., including some or all of the features of the methods of FIGS. 5-6) if desired.

While the steps described below with respect to FIGS. 5-6 are shown in a certain order, it should be noted that, according to various embodiments, one or more of the steps may be omitted, repeated, or performed in a different order than shown. One or more additional steps may also or alternatively be added, as desired.

Figure 5A:
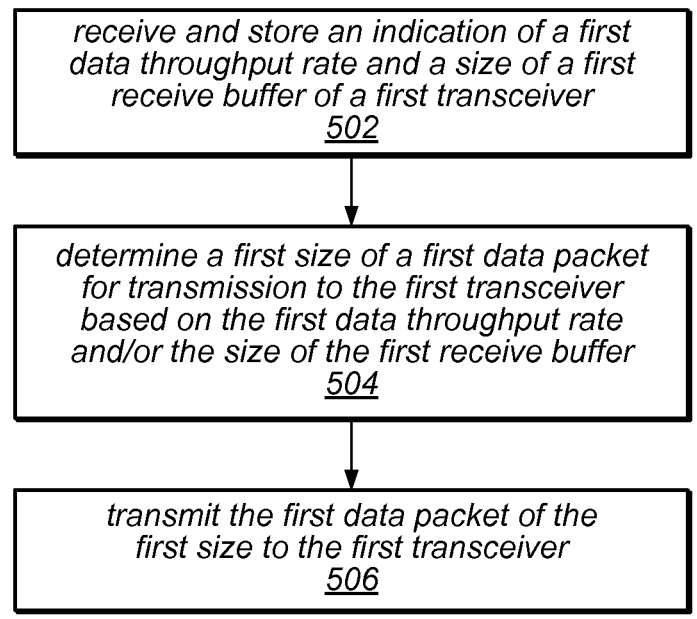
FIGS. 5-6 are flowchart diagrams illustrating embodiments of methods for improving channel efficiency in a wireless link.
Figure 5B:
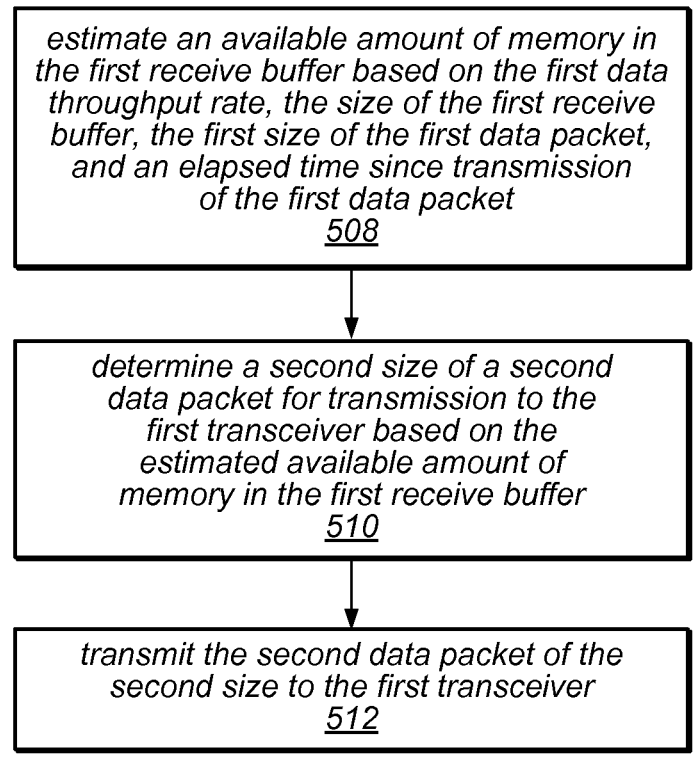

As noted above, FIGS. 5A-5B illustrate a method for improving channel efficiency in a wireless link between a first transceiver and an access-point transceiver. In the method of FIGS. 5A-5B, the access-point transceiver may control the flow of transmissions to the first transceiver based on specific information regarding the capabilities of the first transceiver. In particular, the access-point transceiver may make use of knowledge of a device-based data throughput rate of the first transceiver and a size of a receive buffer of the first transceiver in order to determine how frequently and/or how much data to transmit to the first transceiver. By controlling transmission flow, over-saturation of the receive buffer of the first transceiver (e.g., to the point where data transmitted over the wireless link is lost) may be avoided. Thus, data may be transmitted to the first transceiver via the wireless link without the signaling rate over the wireless link being limited by the data throughput rate of the first transceiver.

The first transceiver may include an antenna for wirelessly transmitting and receiving signals via the wireless link. The first transceiver may also include a processor and memory for processing data received via the wireless link (and potentially for performing other functions). The first transceiver may have a first data throughput rate that is lower than a data throughput rate of the wireless link. The first data throughput rate may be lower than the wireless link data throughput link because the first device may only capable of processing data (e.g., due to processor or interface limitations, among other possible limitations) at the first data throughput rate or less. Alternatively, the first device may not necessarily be limited to the first data throughput rate, but may currently be operating with the first data throughput rate (e.g., due to also performing other functions, or for any of a variety of reasons).

The first transceiver may have a first receive buffer. The first transceiver may store data received (e.g., from the access-point transceiver) via the wireless link in the first receive buffer, for processing by the first transceiver. According to some embodiments, once data has been processed by the first transceiver, it may be removed from the first receive buffer.

The access-point transceiver may include an antenna for wirelessly transmitting and receiving signals. The access-point transceiver may further include a memory for storing parameter information for the wireless link, and potentially other information. Furthermore, the access point transceiver may include control logic coupled to the antenna and the memory. The control logic may be configured to implement the method. The method may be performed as follows.

At step 502, an indication of the first data throughput rate and the size of a first receive buffer of the first transceiver may be received and stored. In some embodiments, the first transceiver may determine the size of the first receive buffer and/or the first data throughput rate. The first transceiver may accordingly transmit the indication of the first data throughput rate and the size of the first receive buffer to the access point receiver.

Alternatively, embodiments are considered in which the access-point transceiver may receive the indication of the first data throughput rate and the size of the first receive buffer in another manner. For example, the access point transceiver could query a database correlating types of wireless devices with receive buffer sizes and data throughput rates based on a type/model of device of the first wireless device. The database might be locally stored/maintained (e.g., by the access-point transceiver) or remotely stored/maintained (e.g., by another device to which the access-point transceiver has communicative access), among other possible options.

At step 504, a first size of a first data packet for transmission to the first transceiver may be determined. The first size of the first data packet may be determined based on the first data throughput rate and/or the size of the first receive buffer. In some embodiments, the first size of the first data packet may be based only on the size of the first receive buffer; for example, the first size of the first data packet may be smaller than the first receive buffer. In some embodiments, the first size of the first data packet may be determined such that an integer number of packets may fit in the first receive buffer, although in other embodiments this may not be a consideration.

At step 506, the first data packet of the first size may be transmitted to the first transceiver. The first data packet of the first size may be transmitted to the first transceiver at a signaling rate (a data throughput rate of the wireless link) that is higher than the first data throughput rate.

In some embodiments, a first transmission frequency at which packets of the first size should be transmitted to the first transceiver may also be determined. In this case, a plurality of data packets of the first size may be transmitted to the first transceiver at the first transmission frequency. The first transmission frequency may be based (at least in part) on a wireless link data throughput rate (e.g., a signaling or PHY rate) of the wireless link.

The frequency with which packets of the first size should be transmitted to the first transceiver may be determined based on the first data throughput rate. The first size of data packets and the determined frequency may be configured to avoid overflowing the first receive buffer. The first size of data packets and the determined frequency may in some embodiments more specifically be configured to provide data to the first transceiver substantially at the first data throughput rate. In other words, the access-point transceiver may transmit data packets at a signaling rate that is higher than the first data throughput rate, but may transmit data packets frequently enough (e.g., less frequently than is possible) to match the first data throughput rate of the first transceiver.

FIG. 5B illustrates an optional extension of the method of FIG. 5A. For example, as an alternative to simply determining a first frequency at which to transmit the first sized packets to the first transceiver, the access-point transceiver may utilize the information available to it to estimate an available amount of memory in the first receive buffer, and base transmissions (e.g., size of packets and/or timing of transmissions) on such estimates. As with the method of FIG. 5A, the method may be implemented by control logic of the access-point transceiver. The method may be performed as follows.

At step 508, an available amount of memory in the first receive buffer may be estimated. The available amount of memory in the first receive buffer may be estimated based on the first data throughput rate, the size of the first receive buffer, the first size of the first data packet, and an elapsed time since transmission of the first data packet. For example, the available amount of memory in the first receive buffer might be estimated according to the formula:

$$EST=BUFF-(PACK-(THRU*TIME))$$

where EST is the estimated available amount of memory, BUFF is the size of the first receive buffer, PACK is the first size of the first data packet, THRU is the first data throughput rate, and TIME is the elapsed time since transmission of the first data packet. It should be noted that this formula is intended to be exemplary and non-limiting; other methods of estimating the available amount of memory in the first receive buffer are also envisioned.

At step 510, a second size of a second data packet for transmission to the first transceiver may be determined. The second size of the second data packet may be determined based on the estimated available amount of memory in the first receive buffer. The second size of the second data packet may be smaller than the available amount of memory in the first receive buffer, e.g., in order that transmission of the second packet of the second size to the first transceiver does not overflow the first receive buffer. The second size may be different than the first size, although it is also possible that the second size may the same as the first size.

Alternatively, or an addition, in some embodiments the access-point transceiver may also use the estimated available amount of memory in the first receive buffer to determine timing of transmission of the second data packet for transmission to the first transceiver. For example, if it is determined that the estimated available amount of memory in the first receive buffer is so small that constructing a packet sufficiently small to be completely buffered in the available amount of memory in the first receive buffer would be relatively inefficient, the access-point transceiver may wait a predetermined or dynamic amount of time (e.g., based on knowledge of the first data throughput rate and the estimated available amount of memory in the first receive buffer) before re-assessing the available amount of memory in the first receive buffer and determining the second size of the second data packet.

At step 512, the second data packet of the second size may be transmitted to the first transceiver. As with the first data packet of the first size, the second data packet of the second size may be transmitted at a signaling rate (a data throughput rate of the wireless link) that is higher than the first data throughput rate.

It should be noted that in some embodiments, the access-point transceiver may be capable of extending a wireless link to a second transceiver (e.g., in another wireless device) at the same time as the wireless link with the first transceiver is active. For example, in a WLAN implementation, the access-point wireless device may be configured to form wireless links with a plurality of wireless devices to form a wireless network.

If the second transceiver has a second receive buffer and a second data throughput rate which is also lower than the data throughput rate of the wireless link, the access-point transceiver may be configured to perform one or more aspects of the method, as described with respect to the first transceiver, with respect to the second transceiver.

For example, the access-point transceiver may, in this case, be configured to receive and store an indication of the second data throughput rate and the size of the second receive buffer. A second size of a second data packet for transmission to the second transceiver may be determined based on one or more of the second data throughput rate and/or the size of the second receive buffer. The second data packet of the second size may be transmitted to the second transceiver at a data rate that is higher than the second data throughput rate.

Other aspects of the method may also be performed with respect to the second transceiver. Alternatively, in some embodiments extension of the wireless link to a second transceiver may decrease the effective data throughput over the wireless link to each of the first and second transceivers to a point at which neither the first data throughput rate nor the second data throughput rate is likely to be exceeded. It should be noted that in this case, the signaling rate over the wireless link to each of the first and second transceivers may still be higher than the first and/or second data throughput rates, but because transmissions may sometimes alternate, between the access-point transceiver and the first transceiver, and between the access-point transceiver and the second transceiver, neither the first receive buffer nor the second receive buffer may experience overflow.

The access-point transceiver may, in this case, determine that data throughput to the first transceiver over the wireless link is unlikely to exceed the first data throughput rate (e.g., based on the extension of the wireless link to the second transceiver). In response to this, the access-point transceiver may not determine sizes of data packets for transmission to the first transceiver based on the first data throughput rate or the size of the first receive buffer. In other words, the access-point transceiver may no longer perform flow control for the first wireless device if it determines that it is no longer necessary to do so.

Thus, according to the method of FIGS. 5A-5B, the access-point transceiver may control flow of transmissions from the access-point transceiver to the first transceiver in such a way that the first transceiver may receive data packets at a signaling rate which is higher than the data throughput rate of the first transceiver, without undergoing receive buffer overflow, resulting packet loss, and corresponding transmission retry attempts.

One advantage of the method is that since the method may be implemented by the access-point transceiver, even an older device implemented as the first transceiver may be capable of taking advantage of the method. Depending on the embodiment, such an older first transceiver may or may not require a driver update (e.g., in order to be configured to determine and transmit an indication of its receive buffer size and first data throughput rate). This may be especially useful as older devices may more commonly have device-based limitations to data throughput (e.g., due to older processors or wireless link interfaces).

Similar to FIGS. 5A-5B, which are described above, FIGS. 6A-6B illustrate a method for improving channel efficiency in a wireless link between a first transceiver and an access-point transceiver. In contrast to the method of FIGS. 5A-5B, the method of FIGS. 6A-6B may be performed by the first transceiver, and may operate by leveraging a power savings mode to perform receive flow control on transmissions received from the access-point transceiver.

At step 602, a first data frame may be received via a wireless link (e.g., via the antenna of the first transceiver). The first data frame may be received from the access-point transceiver.

At step 604, the first data frame may be stored in a receive buffer.

At step 606, it may be determined that an amount of available memory in the receive buffer is below a first threshold. The amount of available memory in the receive buffer may fall below the first threshold in part as a result of the first data frame being stored in the receive buffer. The amount of available memory in the receive buffer may fall below the first threshold additionally in part because the first transceiver is unable to process data received via the wireless link as fast as data is received via the wireless link. For example, a data throughput rate of the first transceiver may be lower than a data throughput rate (e.g., a signaling rate) of the wireless link, e.g., because of processor limitations, wireless link interface limitations, and/or other limitations of the first transceiver.

In some embodiments, the first threshold may be configured such that there is substantially no available memory in the receive buffer when the amount of available memory in the receive buffer falls below the first threshold. Alternatively, the first threshold may be configured such that some small or moderate amount of available memory in the receive buffer remains when the amount of available memory in the receive buffer falls below the first threshold, e.g., in order to maintain sufficient buffer for any subsequently received data before the frame acknowledgement (described subsequently with respect to steps 608 and 610) is received by the access-point transceiver. Any of a variety of other values for the first threshold are also considered.

At step 608, a frame acknowledgement may be generated. The frame acknowledgement may acknowledge receipt of the first data frame. The frame acknowledgement may also indicate initiation of a power savings mode, based on determining that the amount of available memory in the receive buffer is below the first threshold.

At step 610, the frame acknowledgement may be transmitted to the access-point transceiver. The access-point transceiver may not transmit a next data frame to the first transceiver after receiving the frame acknowledgement, based on the indication of initiation of the power savings mode. For example, the access-point transceiver may determine, based on the indication of initiation of the power savings mode, that the first transceiver is currently in a power savings mode and not capable of receiving transmissions.

It should be noted that the first transceiver may be capable, as part of a wireless communication protocol according to which the wireless link is formed, of entering a power savings mode in which the first transceiver neither transmits nor receives data wirelessly, and in which the first transceiver does not process data. As one example, a power savings mechanism exists in the 802.11 protocol. Other power savings mechanisms are also known. It should be noted that in some embodiments of the method, despite indicating in the frame acknowledgement that initiation of the power savings mode has occurred, the first transceiver may not actually enter the power savings mode. In other words, the first transceiver may indicate that initiation of the power savings mode has occurred but may remain active in processing data received via the wireless link, e.g., in order to free up space in the first receive buffer. For example, in some embodiments, the method may continue as shown in FIG. 6B and described below with respect thereto.

At step 612, the first data frame in the receive buffer may be processed. According to some embodiments, the first transceiver may include a processor or other logic configured to process the first data frame in the receive buffer.

At step 614, it may be determined that the amount of available memory in the receive buffer is above a second threshold. The amount of available memory in the receive buffer may increase above the second threshold based on the processing of the first data frame in the receive buffer. The second threshold may have any of a variety of values and may be configured in any of a variety of ways. As one example, the second threshold may be configured such that the amount of available memory in the receive buffer is sufficient to buffer at least one additional data frame. In some embodiments, the second threshold may be determined such that substantially all of the memory in the receive buffer is available before the amount of available memory in the receive buffer is above the second threshold. However, in some embodiments, it may be desirable that there be some received data remaining in the receive buffer for the first transceiver to process when the amount of available memory in the receive buffer rises above the second threshold, e.g., in order that a gap in processing of received data may be avoided.

At step 616, an indication of termination of the power savings mode by the first transceiver may be generated, based on determining that the amount of available memory in the receive buffer is above the second threshold. The indication of termination of the power savings mode may be configured for transmission to the access-point transceiver. For example, the indication of termination of the power savings mode may be configured to indicate to the access-point transceiver that the first transceiver is ready to receive data via the wireless link.

At step 618, the indication of termination of the power savings mode by the first transceiver may be transmitted to the access-point transceiver. The access-point transceiver may transmit the next data frame to the first transceiver after receiving the indication of termination of the power savings mode by the first transceiver. In some embodiments, the next data frame may be transmitted to the first transceiver via the wireless link at a higher data rate (e.g., signaling rate) than the data throughput rate of the first transceiver.

Figure 6A:
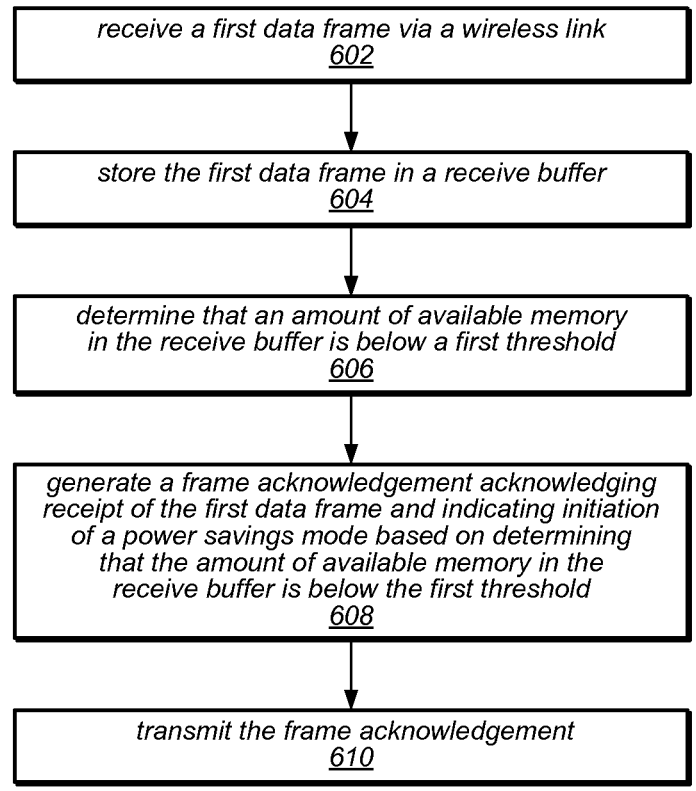
Figure 6B:
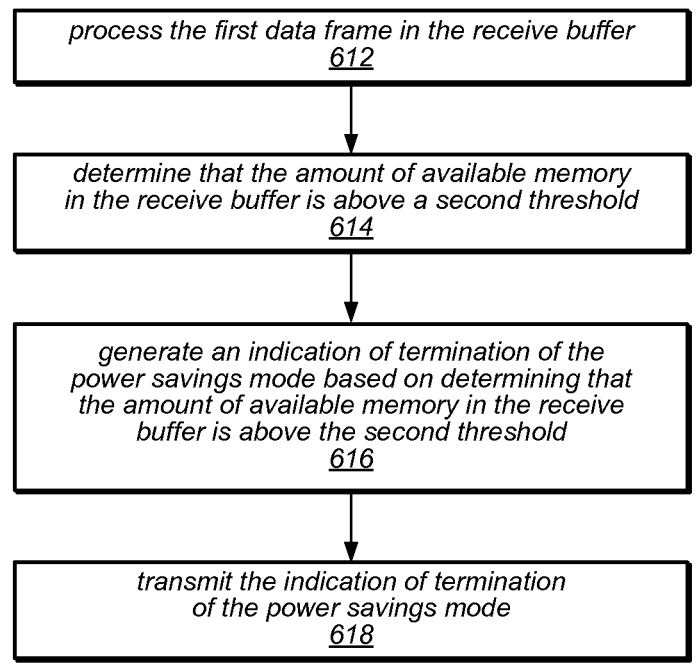

Thus, according to the method of FIGS. 6A-6B, the first transceiver may leverage an existing power savings mechanism to control receive flow of transmissions from the access-point transceiver. As a result, the first transceiver may receive data frames at a signaling rate which is higher than the data throughput rate of the first transceiver without undergoing receive buffer overflow, resulting packet loss, and corresponding transmission retry attempts.

The method of FIGS. 6A-6B may be advantageous insofar as the data flow to the first transceiver may be controlled by the first transceiver, and no updates may be necessary at the access-point transceiver. However, because the method may require a hardware update to implement the method in the first transceiver, legacy devices may not be capable of taking advantage of the method.

One possible concern with the method is that if the power savings mode initiation and termination indications are exchanged overly frequently, the overhead incurred could negatively affect communications via the wireless link. However, if the receive buffer is relatively large compared to an average frame size, this exchange may occur relatively infrequently.

Exemplary Table

Table 1 provided below compares the impact on receive duration and channel efficiency if a wireless link between two devices has to be limited by PHY rate or to be only limited by receive buffer size in a non-limiting exemplary WLAN implementation. In the exemplary implementation of Table 1, it is assumed that the devices support 256QAM modulation, with 80 MHz channels, single chain communication, MSDU size of 1500B (no AMSDU), and maximum AMPDU size of 32 MPDU/MSDU. Thus the highest supported PHY rate (wireless link data throughput rate) is 433 Mbps. It is further assumed that device is hardware-limited to a device data throughput rate of 250 Mbps.

TABLE 1

|  | Limit by PHY rate (234 Mbps) | Limit AMPDU size by 64 KB | Limit AMPDU size by 32 KB | Limit AMPDU size by 16 KB |
|---|---|---|---|---|
| PSDU size/Aggr size | 49.2 KB/32 | 49.2 KB/32 | 30.8 KB/20 | 15 KB/10 |
| PSDU length | 1.73 ms | 0.95 ms | 0.6 ms | 0.32 ms |
| Channel efficiency | 46.2% | 78.3% | 70.7% | 56% |

The first case (limit by PHY rate) is a situation in which the PHY rate of the wireless link is dropped down to a level (234 Mbps) supported by the receiving wireless device. The other three cases (limit AMPDU size) illustrate situations in which the maximum supported PHY rate (433 Mbps) is used for the wireless link, but traffic flow control (e.g., according to either of the methods of FIGS. 5-6) is used to improve channel efficiency. In these three cases, the size of the receive buffer does affect the channel efficiency, but as shown, channel efficiency is significantly improved over the PHY rate limited case even when receive buffer size is smaller than in the exemplary PHY rate limited case.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for improving channel efficiency in a wireless link between an access-point transceiver and a first transceiver, wherein the first transceiver is limited to a first data throughput rate that is lower than the maximum possible data throughput rate of the wireless link, wherein the first transceiver comprises a first receive buffer, the method comprising:

receiving and storing, by the access-point transceiver, an indication of the first data throughput rate and a size of the first receive buffer;

determining, by the access-point transceiver, a first size of a first data packet for transmission to the first transceiver, wherein said determining is based on one or more of: the first data throughput rate and the size of the first receive buffer;

transmitting, by the access-point transceiver, the first data packet of the first size to the first transceiver at a data rate that is higher than the first data throughput rate, extending, by the access-point transceiver, the wireless link to a second transceiver;

determining, by the access-point transceiver, that data throughput to the first transceiver over the wireless link is unlikely to exceed the first data throughput rate based on the extension of the wireless link to the second transceiver; and wherein the access-point transceiver does not determine sizes of data packets for transmission to the first transceiver based on the first data throughput rate or the size of the first receive buffer in response to determining that data throughput to the first transceiver over the wireless link is unlikely to exceed the first data throughput rate.

2. The method of claim 1, further comprising:

determining, by the access-point transceiver, a first transmission frequency at which packets of the first size should be transmitted to the first transceiver based on the first data throughput rate; and transmitting a plurality of data packets of the first size to the first transceiver at the first transmission frequency, wherein said transmitting is performed at a data rate that is higher than the first data throughput rate.

3. The method of claim 1, further comprising:

estimating, by the access-point transceiver, an available amount of memory in the first receive buffer, wherein said estimating is based on the first data throughput rate, the size of the first receive buffer, the first size of the first data packet, and an elapsed time since transmission of the first data packet;

determining, by the access-point transceiver, a second size of a second data packet for transmission to the first transceiver based on the estimated available amount of memory in the first receive buffer; and transmitting, by the access-point transceiver, the second data packet of the second size to the first transceiver at a data rate that is higher than the first data throughput rate.

4. The method of claim 1,
wherein the first data throughput rate is determined by the first transceiver; and
wherein the indication of the first data throughput rate and the size of the receive buffer are received by the access-point transceiver from the first transceiver.

5. The method of claim 1,
wherein the first data throughput rate is lower than the maximum possible data throughput rate of the wireless link because of the data throughput capability of one or more of: 1) a wireless link interface of the first transceiver; and/or 2) a processing capability of the first transceiver.

6. The method of claim 1, further comprising:
extending, by the access-point transceiver, the wireless link to the second transceiver, wherein the second transceiver has a second data throughput rate that is lower than the maximum possible data throughput rate of the wireless link, wherein the second transceiver comprises a second receive buffer;
receiving and storing, by the access-point transceiver, an indication of the second data throughput rate and a size of the second receive buffer;
determining, by the access-point transceiver, a second size of a second data packet for transmission to the second transceiver, wherein said determining is based on one or more of: 1) the second data throughput rate; and/or 2) the size of the second receive buffer; and
transmitting, by the access-point transceiver, the second data packet of the second size to the second transceiver at a data rate that is higher than the second data throughput rate.

7. The method of claim 1, wherein the first size of the first data packet is smaller than the size of the first receive buffer.

8. The method of claim 1, wherein the first receive buffer stores information received by the first transceiver over the wireless link for processing by the first transceiver.

9. The method of claim 1, wherein the wireless link is an 802.11 wireless link.

10. An access-point transceiver configured to improve channel efficiency in a wireless link with a first transceiver, wherein the first transceiver is limited to a first data throughput rate that is lower than the maximum possible data throughput rate of the wireless link, wherein the first transceiver comprises a first receive buffer, the access point transceiver comprising:
an antenna for receiving and transmitting wireless signals;
a memory for storing parameter information for the wireless link;
control logic coupled to the antenna and the memory, wherein the control logic is configured to:
receive an indication of the first data throughput rate and a size of the first receive buffer;
store information indicating the first data throughput rate and the size of the first receive buffer in the memory;
determine a first size of a first data packet for transmission to the first transceiver based on one or more of: the first data throughput rate and the size of the first receive buffer;
transmit, via the antenna, the first data packet of the first size to the first transceiver at a data rate that is higher than the first data throughput rate;
extend the wireless link to a second transceiver;
determine that data throughput to the first transceiver over the wireless link is unlikely to exceed the first data throughput rate based on the extension of the wireless link to the second transceiver; and
wherein the access-point transceiver is configured to not determine sizes of data packets for transmission to the first transceiver based on the first data throughput rate or the size of the first receive buffer in response to determining that data throughput to the first transceiver over the wireless link is unlikely to exceed the first data throughput rate.

11. The access-point transceiver of claim 10, wherein the control logic is further configured to:
determine a first transmission frequency at which packets of the first size should be transmitted to the first transceiver based on the first data throughput rate; and
transmit, via the antenna, a plurality of data packets of the first size to the first transceiver at the first transmission frequency, wherein said transmitting is at a data rate that is higher than the first data throughput rate.

12. The access-point transceiver of claim 10, wherein the control logic is further configured to:
estimate an available amount of memory in the first receive buffer based on the first data throughput rate, the size of the first receive buffer, the first size of the first data packet, and an elapsed time since transmission of the first data packet;
determine a second size of a second data packet for transmission to the first transceiver based on the estimated available amount of memory in the first receive buffer; and
transmit, via the antenna, the second data packet of the second size to the first transceiver at a data rate that is higher than the first data throughput rate.

13. The access-point transceiver of claim 10, wherein the first data throughput rate is lower than the maximum possible data throughput rate of the wireless link because of the data throughput capability of one or more of: 1) a wireless link interface of the first transceiver; and/or 2) a processing capability of the first transceiver.

14. The access-point transceiver of claim 10, wherein the control logic is further configured to:
extend the wireless link to the second transceiver, wherein the second transceiver has a second data throughput rate that is lower than the maximum possible data throughput rate of the wireless link, wherein the second transceiver comprises a second receive buffer;
receive an indication of the second data throughput rate and a size of the second receive buffer;
store information indicating the second data throughput rate and the size of the second receive buffer in the memory;
determine a second size of a second data packet for transmission to the second transceiver based on one or more of: 1) the second data throughput rate; and/or 2) the size of the second receive buffer; and
transmit, via the antenna, the second data packet of the second size to the second transceiver at a data rate that is higher than the second data throughput rate.

15. The access-point transceiver of claim 10, wherein the first size of the first data packet is smaller than the size of the first receive buffer.

16. The access-point transceiver of claim 10, wherein the first receive buffer stores information received by the first transceiver over the wireless link for processing by the first transceiver.

17. The access-point transceiver of claim 10, wherein the control logic is configured to receive the indication of the first data throughput rate and the size of the first receive buffer, via the antenna, from the first transceiver.

18. The access-point transceiver of claim 10, wherein the wireless link is an 802.11 wireless link, wherein the access-point transceiver is an 802.11 access-point transceiver.

\* \* \* \* \*